(12) United States Patent
Stahle

(10) Patent No.: US 6,308,597 B1
(45) Date of Patent: Oct. 30, 2001

(54) LOCKING DEVICE FOR A HAND TOOL

(75) Inventor: Ragnar Stahle, Ljungskile (SE)

(73) Assignee: Fast Industriprodukter HB, Ljungskile (SE)

( * ) Notice: Subject to any disclaimer, the term of this patent is extended or adjusted under 35 U.S.C. 154(b) by 0 days.

(21) Appl. No.: 09/269,201

(22) PCT Filed: Sep. 30, 1997

(86) PCT No.: PCT/SE97/01647

§ 371 Date: Mar. 31, 1999

§ 102(e) Date: Mar. 31, 1999

(87) PCT Pub. No.: WO98/14308

PCT Pub. Date: Apr. 9, 1998

(30) Foreign Application Priority Data

Oct. 1, 1996 (SE) .................................................. 9603581

(51) Int. Cl.[7] .......................................................... B25B 7/14
(52) U.S. Cl. ............................... 81/319; 81/302; 81/321; 81/423; 81/424
(58) Field of Search ............................... 81/318–325, 302, 81/313–314, 328, 336–340, 419–424; 294/99.2; 269/263, 281; 128/321, 322; 606/210

(56) References Cited

U.S. PATENT DOCUMENTS

| | | | | |
|---|---|---|---|---|
| 448,451 | * | 3/1891 | Miller .................................... | 81/423 |
| 832,317 | * | 10/1906 | Hinds .................................... | 81/321 |
| 844,134 | * | 2/1907 | Jenkins ................................... | 81/423 |
| 1,106,518 | * | 8/1914 | Matti ..................................... | 81/319 |
| 1,216,527 | * | 2/1917 | Weldon et al. ......................... | 81/423 |
| 1,636,448 | * | 7/1927 | Whipple ............................. | 81/302 X |
| 3,176,689 | * | 4/1965 | Yahr ................................... | 81/318 X |
| 3,320,958 | * | 5/1967 | Nolan ................................. | 81/314 X |
| 3,503,398 | * | 3/1970 | Fogarty et al. ..................... | 81/423 X |
| 4,787,279 | * | 11/1988 | Undin .................................... | 81/313 |
| 5,156,431 | * | 10/1992 | Lowe .................................... | 294/99.2 |
| 5,591,176 | * | 1/1997 | Henderson et al. ............... | 81/318 X |
| 5,630,345 | * | 5/1997 | Ciccotelli ........................... | 81/424 X |
| 5,649,445 | * | 7/1997 | Lavoie et al. ..................... | 81/423 X |
| 5,791,210 | * | 8/1998 | Wolff et al. ........................... | 81/302 |

* cited by examiner

*Primary Examiner*—D.S. Meislin
(74) *Attorney, Agent, or Firm*—Dennison, Scheiner, Schultz & Wakeman

(57) ABSTRACT

A pair of tongs is disclosed that includes first and second spaced apart members each having a first end having a jaw-like part and a second end, the second ends of the first and second members being movable toward and away from each other by the use of one hand. A first connecting element with a first straight toothed surface extends from a point on the first member between its first and second ends and a second connecting element having a second straight toothed surface facing the first straight toothed surface extends from a point on the second member between the first and second ends of the second member for releasably engaging the first connecting element. The first toothed surface includes first and second rows of teeth and the second row of teeth is displaced relative to the first row of teeth.

4 Claims, 19 Drawing Sheets

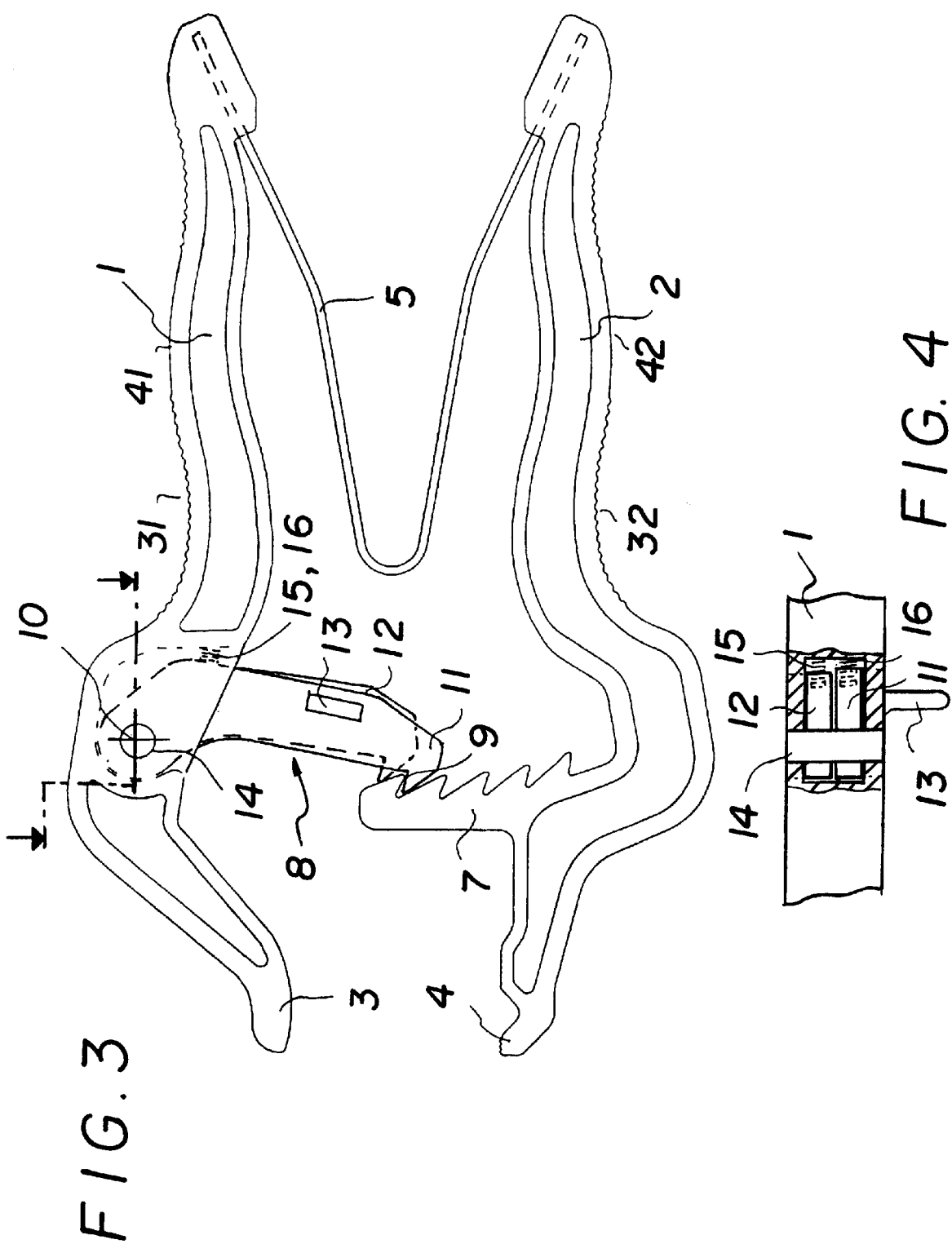

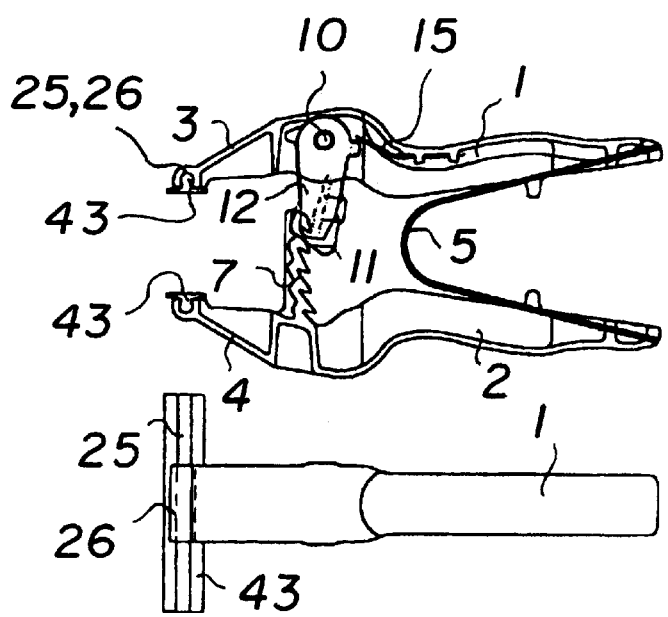
FIG. 12
FIG. 13
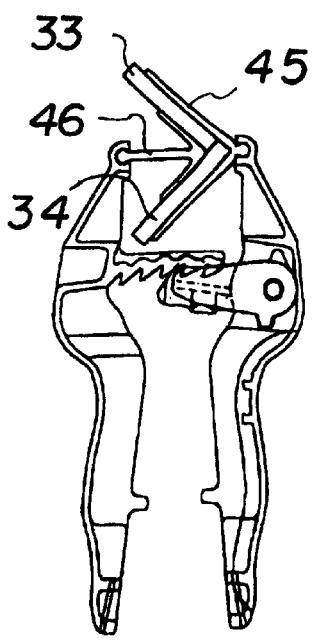
FIG. 15
FIG. 14
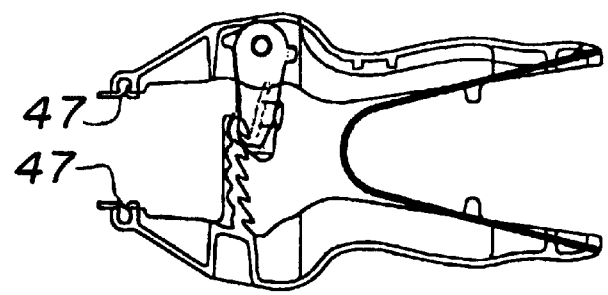
FIG. 16

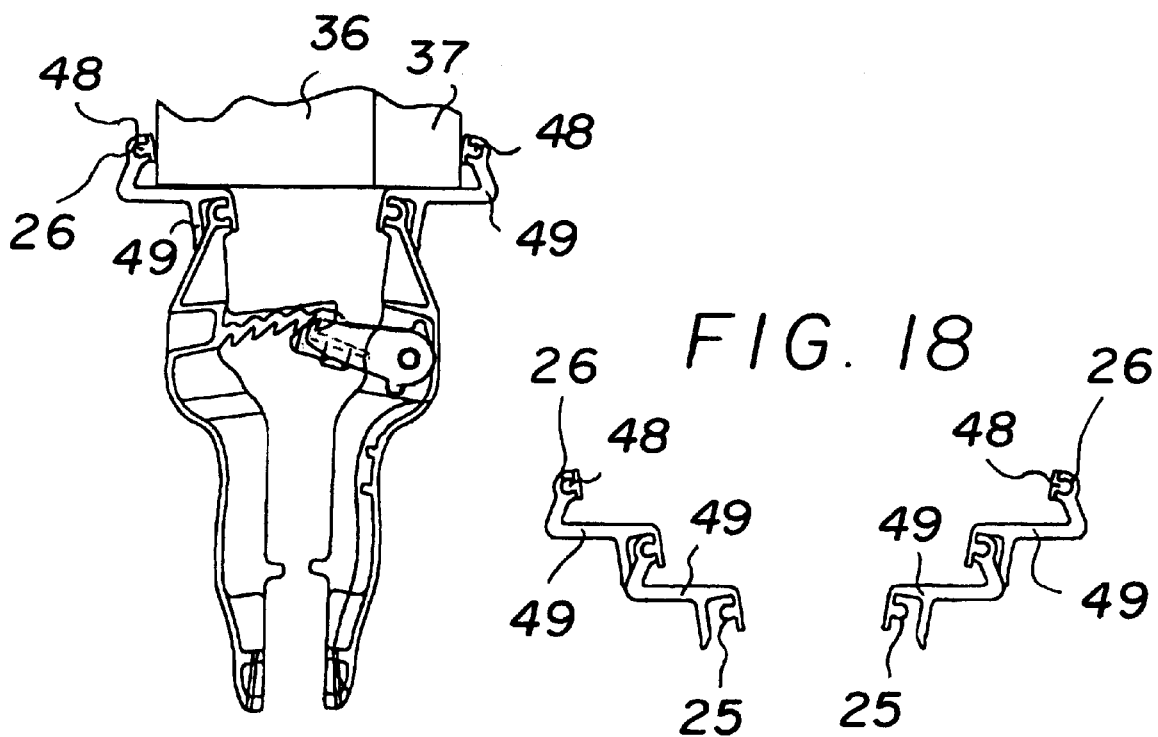
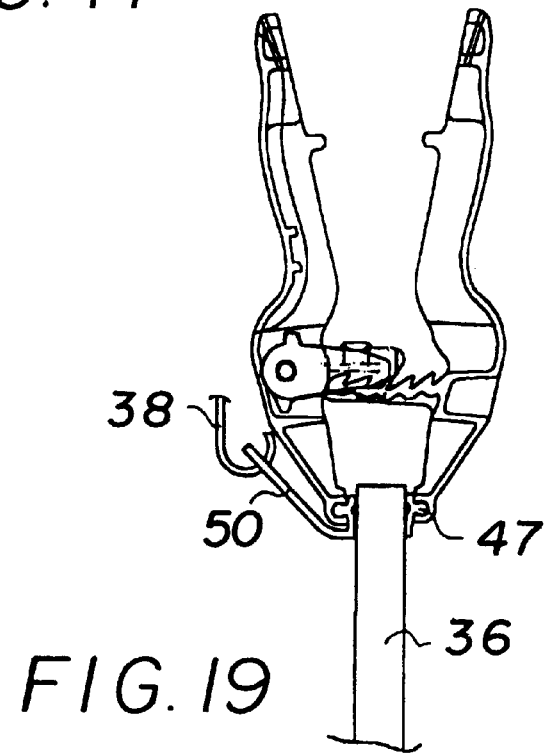

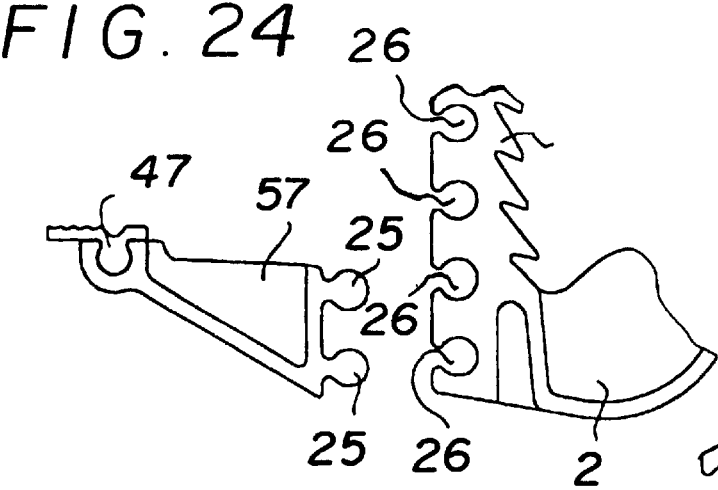
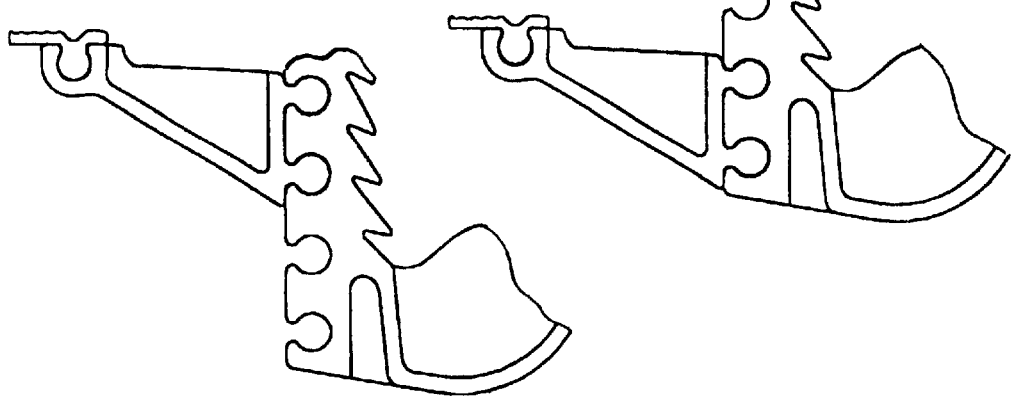
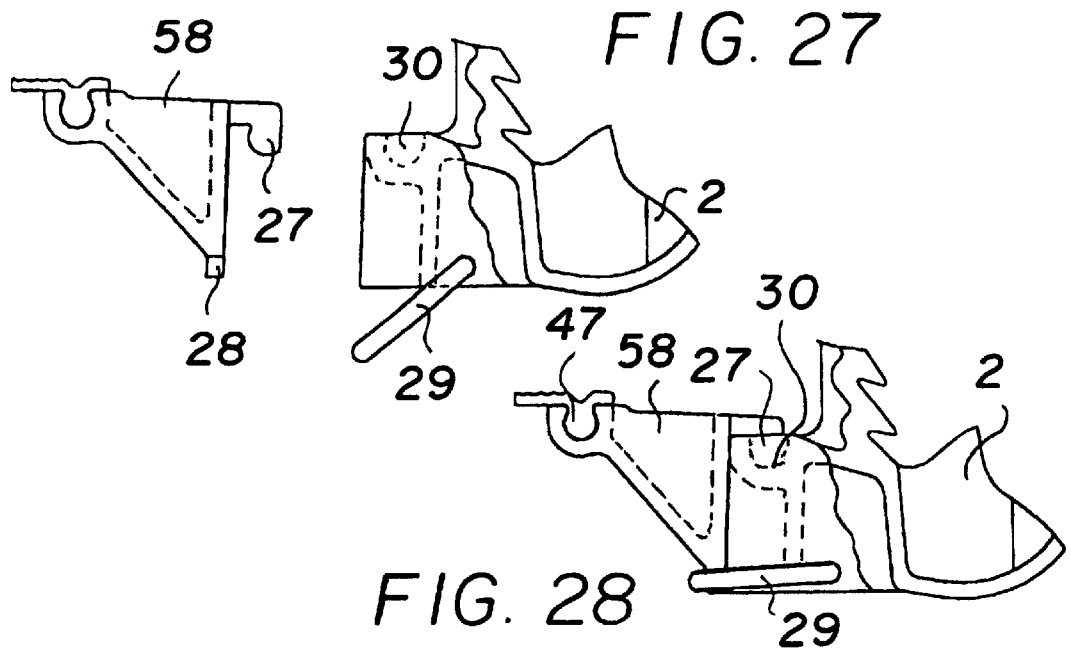

LOCKING DEVICE FOR A HAND TOOL

FIELD OF INVENTION

The present invention relates to a hand tool to lockably apply a compressive or separating force on a workpiece, said tool comprising two shafts pivotable in relation to each other, the ends of which form two jaws for cooperation with the workpiece and which, spaced from these ends, are joined together by a spring element with an action corresponding to a compressible compression spring, and a locking device between said spring element and said jaws, said locking device comprising a toothed locking element protruding from one of the shafts and a locking device on the other shaft arranged by engagement with the toothed locking element to releasably lock the position of a joint about the spring element.

DESCRIPTION OF THE PRIOR ART

Patent specification EP 0403517 describes a tool according to the above, comprising two shafts with jaws, a spring element and a locking device, which locking device produces a movable joint. The movable joint enables a combination of high clamping force and large working range. To obtain a high clamping force on workpieces of varying thicknesses the possible locked positions for the joint must be as close together as possible. The above patent suggests different designs of locking devices which can be divided into two main groups: shape-dependent and friction-dependent locking devices. Friction-dependent locking devices allow in principle stepless adjustment of the position of the joint, but have the drawback that they require considerable contact forces. These large contact forces require the locking element and locking member to be manufactured of high-strength material, thereby greatly increasing manufacturing costs. In practice, therefore, shape-dependent locking devices have come to be used for this type of hand tool, said locking devices comprising a toothed locking element protruding from one of the shafts and a locking member in the form of a catch on the other shaft, arranged by engagement in the toothed locking element to releasably lock the position of the joint. It has been found that a catch that is pivotably suspended in the second shaft offers particularly good function. The drawback with this type of locking device is that the teeth on the locking element can hardly be closer together than 2.5 mm if they are manufactured of metal with high precision, if a reliable locking function is to be obtained. This means that greater amplification than approximately 3 times the force cannot be obtained if an acceptable clamping function is to be obtained on workpieces of varying thicknesses when the tool is operated. with one hand. There has hitherto been no satisfactory solution to this limitation in force amplification. Furthermore, due to the demand for locking positions close together, and thus small teeth, it has hitherto been impossible to achieve a reliable locking device made from plastic, which is desirable since the tool can then be produced more cheaply.

SUMMARY OF THE INVENTION

The main object of the present invention is to provide a hand tool as described above consisting of two shafts with jaws, a spring element and a shape-dependent locking device which produces a movable joint, said locking device combining reliable locking function and tightly spaced locked positions for the joint.

This object is achieved with a hand tool to lockably apply a compressing or separating force on a workpiece, said tool comprising two shafts pivotable in relation to each other, the ends of which form two jaws for cooperation with the workpiece and which, spaced from these ends are joined together by a spring element with an action corresponding to a compressible compression spring, and a locking device between said spring element and said jaws, said locking device comprising a toothed locking element protruding from one of the shafts and a locking device on the other shaft arranged by engagement with the toothed locking element to releasably lock the position of a joint about which the shafts can pivot in relation to each other under influence of the spring element, said locking device comprising two or more catches and/or said locking element comprising two or more rows of teeth.

BRIEF DESCRIPTION OF THE DRAWINGS

The invention will now be described in more detail with reference to the accompanying drawings which are intended to explain and to not limit the invention, in which FIG. 3 is a side view of a preferred embodiment of a tool made from plastic material, FIG. 4 is a partial view, partly in section, showing the tool according to FIG. 3 from above.

FIG. 12 shows the tool provided with tiltable collet jaws.

FIG. 13 is a view from above of the tool according to FIG. 12, showing the lateral extension of the collet jaws.

FIG. 14 shows the tool in squeezed position, provided with collet jaws for securing at right angles.

FIG. 15 shows the tool in squeezed position, provided with collet jaws for securing at right angles.

FIG. 16 shows the tool provided with fixed collet jaws for metal objects.

FIG. 17 shows the tool in squeezed position, provided with extended collet jaws.

FIG. 18 shows a side view of extended collet jaws connected together.

FIG. 19 shows the tool in squeezed position, provided with collet jaws for suspension from a hook.

FIG. 20 shows the tool provided with contact jaws with an electric conductor between.

FIG. 21 shows the tool provided with contact jaws without an electric conductor between.

FIG. 24–26 show partial side view of a coupling arrangement between jaw and shaft.

FIG. 27–28 show partial side view of a coupling arrangement between jaw and shaft.

DETAILED DESCRIPTION OF THE INVENTION

Figure 1:
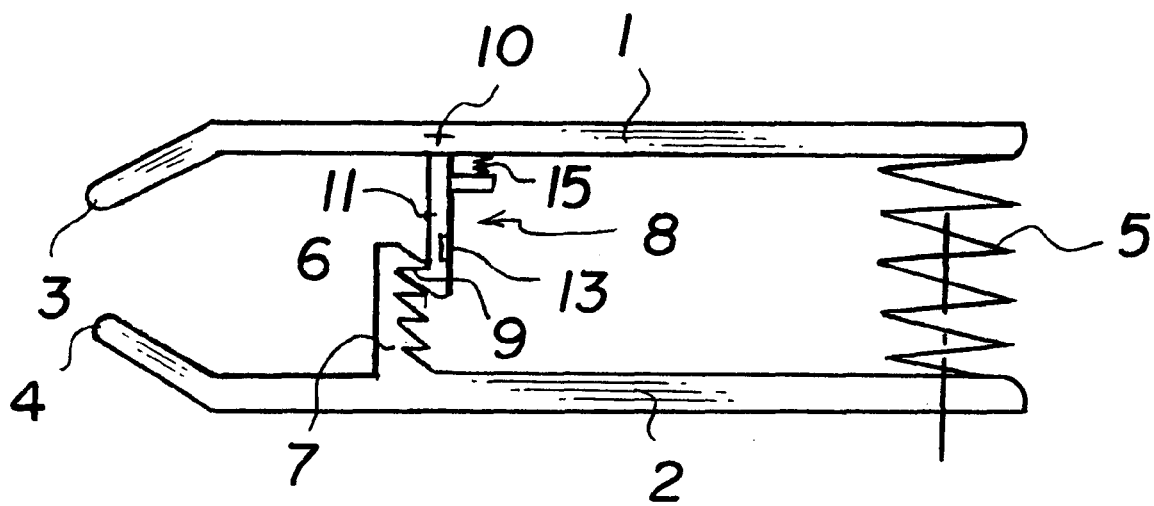
FIG. 1 is a side view showing the construction of the tool in principle.
Figure 2:
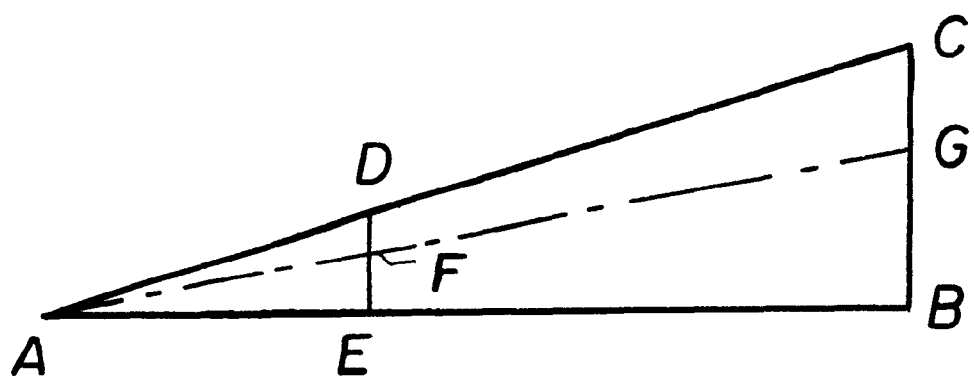
FIG. 2 is intended to explain the relationship between force amplification and the movement of the locking device during compression of the spring.

In its basic design, the tool is constructed in accordance with FIG. 1 with two shafts 1 and 2 provided at their ends with jaws 3 and 4. The shafts are joined by a spring element 5 at the opposite ends. Between the jaws and the spring element is a locking device 6 comprising a toothed locking element 7 protruding from the shaft 2, and a locking member 8 comprising a catch 11 pivotably suspended in the joint 10 on the shaft 1, a spring element 15 that presses the catch against the toothed locking element, and a lever 13 to release the catch from the locking element 7. In its non-deformed state the spring element 5 defines the rest position of the shafts in relation to each other. The jaws 3 and 4 are then preferably spaced from each other so that a workpiece can easily be inserted between them. The exterior of the shafts is provided with grips between the spring element 5 and the locking device 6, to enable convenient manipulation with one hand. When a work-piece is to be gripped, the gripping portions are pressed together. The jaws of the shafts are thus pivoted in relation to each other and the spring element 5 is bent somewhat, without noticeable compression. Upon such a pivoting movement the catch 11 slips over the teeth of the locking element 7. When the jaws come into contact with the workpiece the compressive force is increased and the spring element 5 is thus compressed. During this compression phase, the catch 11 slips ever another few teeth on the locking element 7. When the gripping portions are then released, the catch will be in locked position. The force from the compressed spring element 5 will then strive to swing the shafts 1 and 2 in relation to each other around the joint 9, in practice around both the joints 9 and 10. A clamping force then arises on the workpiece, the magnitude of which depends on the position of the joints 9 and 10 between the spring element 5 and the jaws 3 and 4. A force amplification will occur if the joints 9 and 10 are nearer the jaws than the spring element. The account above is substantially an account of known technology according to EP 0403517. Referring now to FIG. 2, the limitations of this technology will be discussed, paying particular attention to the function of the locking device. The Figure shows two triangles of similar shape, ADE and ACB. Point A represents the contact point of the jaw 3 with the workpiece. This is the point around which the shaft 1 pivots when the spring element 5 is compressed the distance CG. The force from the spring element 5 is assumed to operate along the line BC. During the compression phase the shaft 1 is moved from position AC to position AG. The catch 11 is thus moved the distance DF. The fundamental limitation is the working range of the human hand. An average hand can comfortably achieve a force grip with a distance between the two gripping portions that can vary from 50 mm up to maximally 80 mm. The maximum compression distance CC for the spring element is thus approximately 30 mm. If twice the force amplification is to be achieved, the distance EB must be twice the distance AE. The distance AB will therefore be three times greater than AE. Since the triangles are similar, this results in the distance DF being one third of the distance CG. The conclusion is, therefore, that the displacement of the catch 11 during the compression phase will be only 10 mm. In the same way, three times the force amplification will result in the distance DF being reduced to one fourth of the distance CG. To obtain acceptable function of the tool, at least three locked positions for joint 9 are required during the compression phase. At least two different levels of squeezing force can then be applied to the workpiece and ⅔ of the maximum squeezing force is always available.

If this is to be achieved with three times the force amplification, the distance between the locked positions for the joints must be at most 2.5 mm. The teeth on the locking element 7 must then necessarily be small and must be manufactured with high precision in metal in order to ensure reliable engagement of the catch 11 in the locking element, without risk of breaking when the locking device is subjected to considerable forces under the influence of the spring element 5. For the above reason it is impossible to increase the force amplification any more with a shape-dependent locking device according to known technology. Neither is it possible to manufacture a locking device of plastic material, which would be preferable since this would greatly reduce the manufacturing costs. To obtain a reliable lock in plastic the tooth distance would have to be about 8 mm. Even if a force amplification of about 1.6 times is accepted, conventional technology does not permit greater distance between the teeth than about 4 mm.

Figure 5:
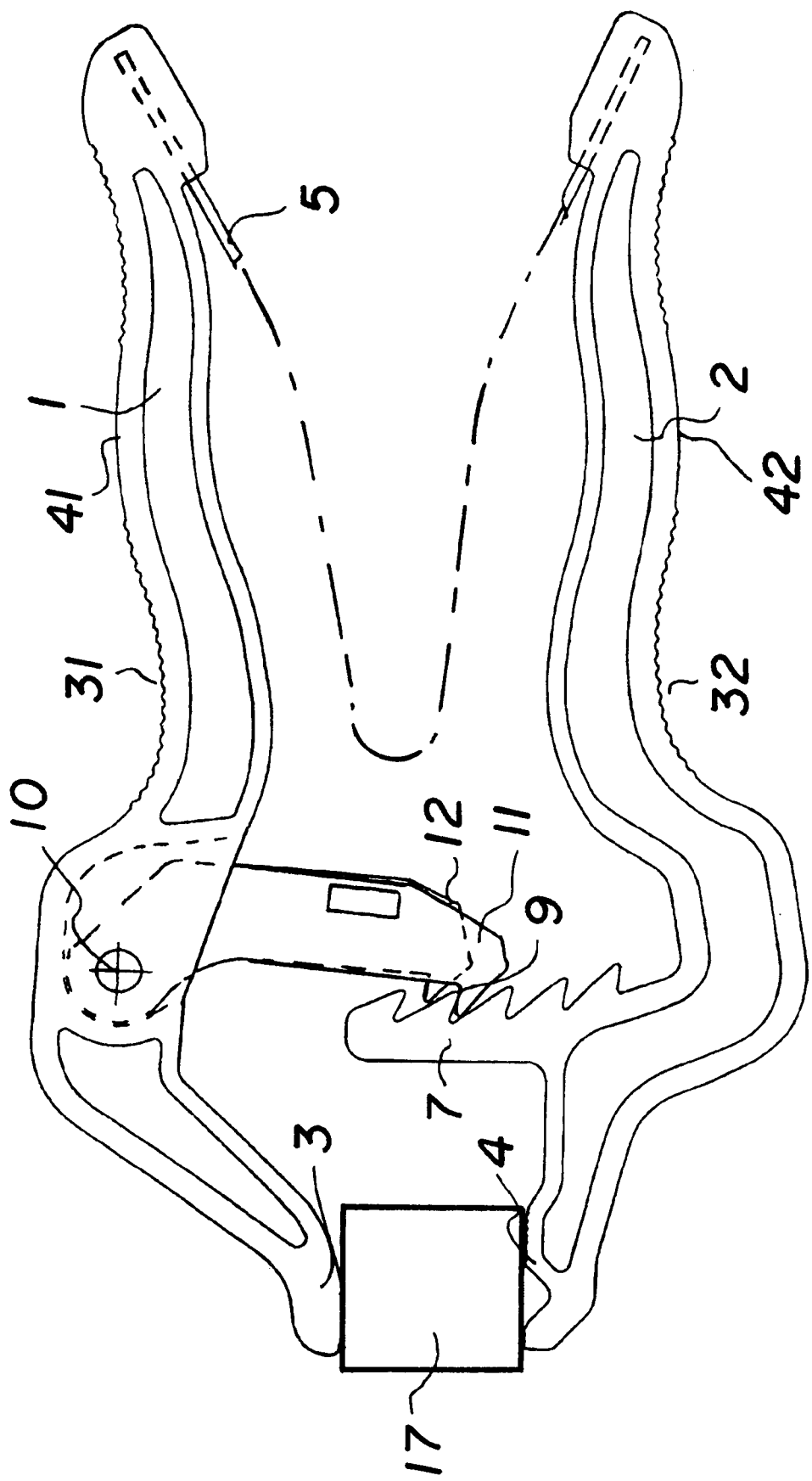
FIG. 5 is a side view or the tool according to FIG. 3, with the jaws in engagement with a workpiece.
Figure 6:
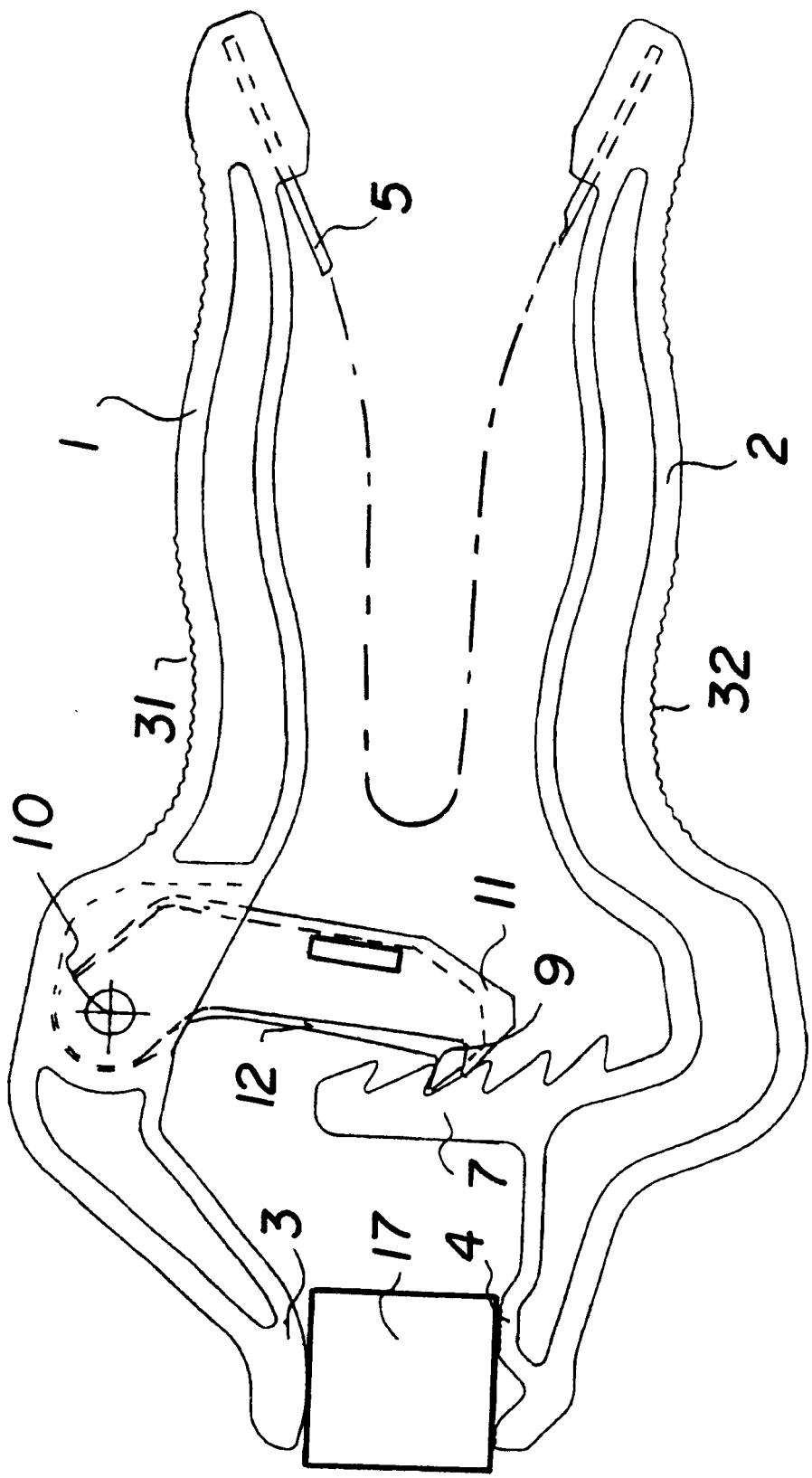
FIGS. 6 and 7 are side views showing the tool according to FIG. 5 with the spring element in varying degrees of compression.
Figure 7:
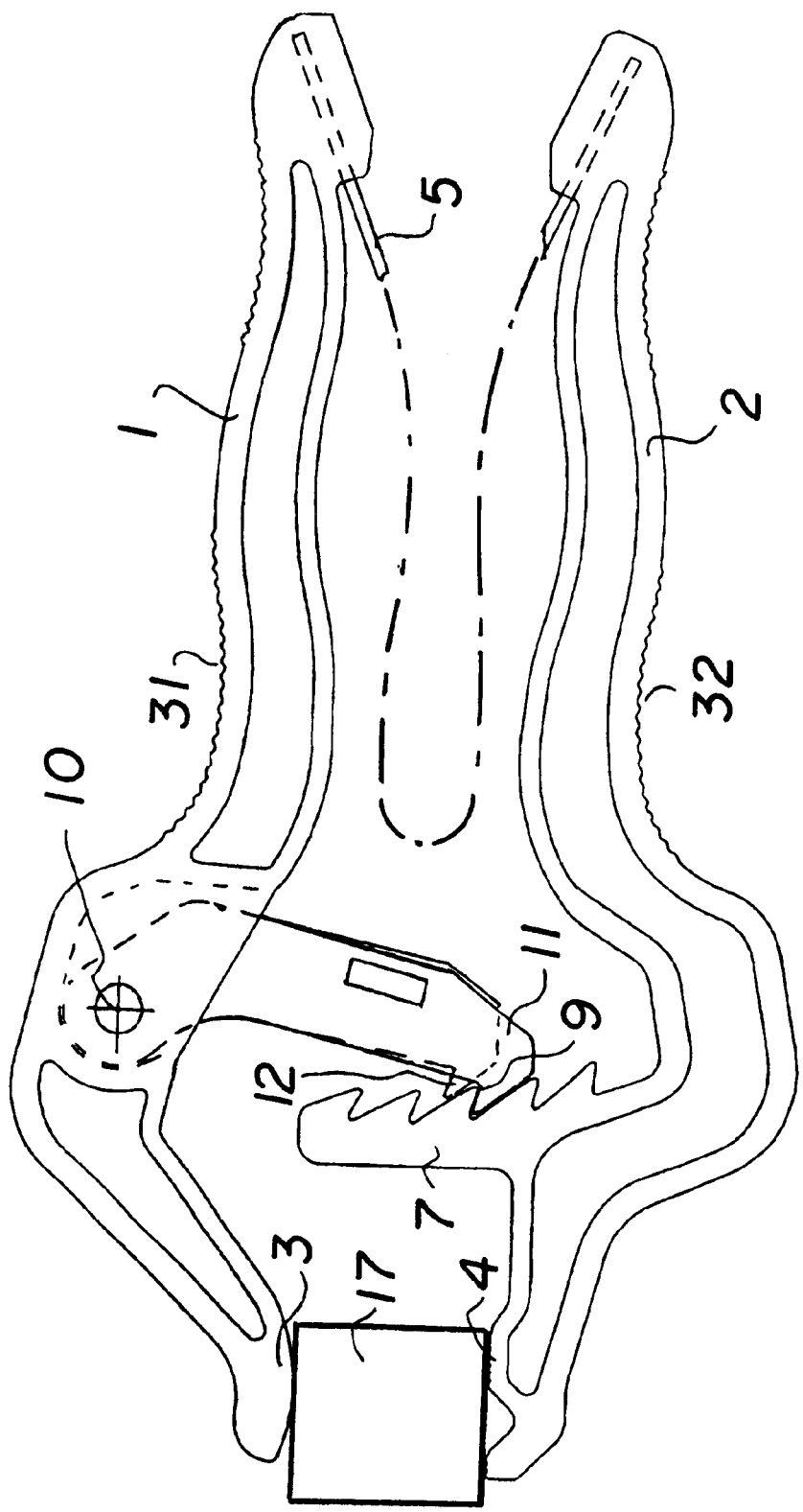

FIGS. 3 and 4 show the solution to the problem defined in the paragraph above, in a preferred embodiment of a tool according to the invention, manufactured mainly of plastic material. The shafts 1 and 2 are made in one piece with the jaws 3 and 4, respectively, from reinforced plastic material. The shafts 1 and 2 are provided externally with gripping portions. A toothed locking element 7 with a tooth distance of about 8 mm protrudes from the shaft 2 and in one piece therewith. The locking element 7 cooperates with a locking member 8 on the shaft 1. This locking member comprises two catches 11 and 12, pivotably suspended in the joint 10 consisting of the pin 14 in the shaft 1. The catches, also, are made of a reinforced plastic material and characterized in that they are displaced in relation to each other by approximately half a tooth distance, so that they do not engage simultaneously in the teeth of the locking element 7. The locking member 8 also includes the spring elements 15 and 16 which press the catches 12 and 11, respectively, against the toothed locking element 7. The locking member 8 also comprises a lever 13 to be manipulated with the thumb in order to release the catches 11 and 12 from their locked position. The lever 13 is manufactured in one piece with the catch 11. Some form of driver is required on the catch 11 to enable manipulation of the catch 12 with this lever 13, and a corresponding groove in the catch 12, which is not shown in the figure. The shafts 1 and 2 with their jaws and locking parts are retained in rest position by means of a spring element 5, preferably in the form of a plate spring made of steel. The spring element 5 is preferably embedded at each end into the shafts 1 and 2. When the gripping portions 31 and 32 of the shafts 1 and 2 are pressed together, the jaws 3 and 4 will swing towards each other without noticeable compression of the spring element 5, whereupon the highest points 41 and 42 are at approximately the same distance from each other. This is illustrated in FIG. 5 where the jaws 3 and 4 are in initial contact with a workpiece 17 and the catch 11 engages with a tooth in the locking element 7. If the gripping portions 31 and 32 are subjected to increased compressive force, the spring element 5 will be compressed and the locking member 8 is moved in relation to the locking element 7. This is illustrated in FIG. 6 where the locking member has moved half a tooth distance and the catch 12 engages with the same tooth of the locking element 7 as was previously in engagement with the catch 11. Upon further compression of the gripping parts 31 and 32 the catch 11 engages in the next tooth of the locking element 7, as shown in FIG. 7.

The compression phase is now complete and when the gripping portions are released the force from the spring element 5 will endeavour to pivot the shafts 1 and 2 around the joint 9, thus producing reinforced clamping pressure on the workpiece 17. During the compression phase the joint 9 has been displaced approximately 8 mm in two steps. Thanks to the arrangement with double catches, both these positions of the joint 9 have been reliably locked. The tooth distance is approximately 8 mm and the teeth on the locking element 7 can therefore be made of plastic material and still be dimensioned to withstand protracted loading. Furthermore, the engagement distance is sufficiently long to prevent risk of the catches 11 and 12 slipping out of their locked positions. In the embodiment according to FIGS. 3–7 the catches 11 and 12 operate beside each other on half the width of the teeth 7 in the locking element. To avoid uneven loading the catches may instead be arranged in the form of an inner and an outer catch, the outer catch being provided with two gripping surfaces, one on each side of the inner catch.

Figure 8:
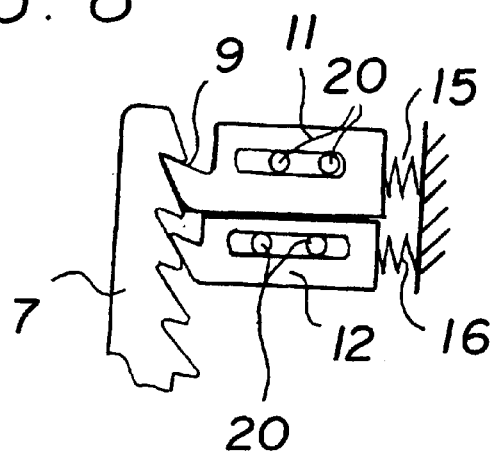
FIG. 8 is a side view showing an alternative embodiment of the locking device with two catches controlled to linear movement.

In FIG. 8, illustrating the principle of the invention, the catch 11 is placed above the catch 12. This allows them to operate across the whole width of the teeth in the locking element 7. The catches are here controlled to linear movement by the pin 20. As previously, the catches are pressed against the teeth of the locking element 7 by the spring elements 15 and 16. To allow space for the guides and the material thickness required for strength, the distance between the engagement surfaces of the catches has been increased to 1.5 of the tooth distance.

Figure 9:
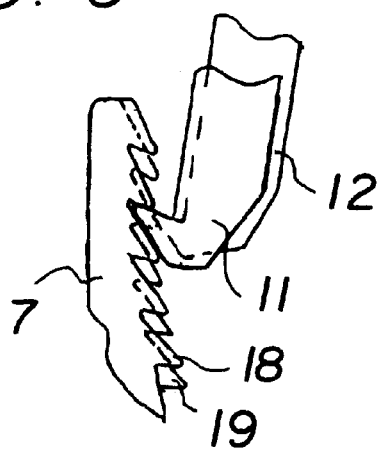
FIG. 9 is a side view showing a toothed locking element with two different rows of teeth and catches pertaining thereto.
Figure 10:
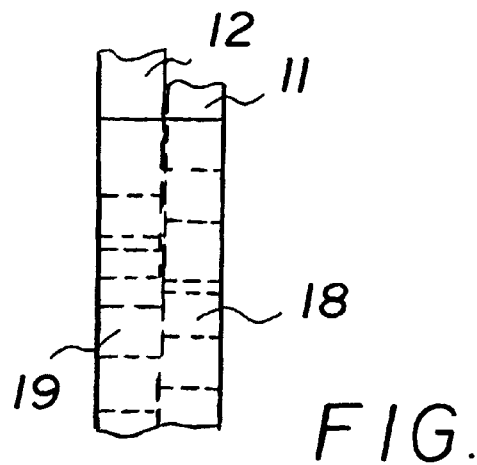
FIG. 10 is a view from the front of the device according to FIG. 9.

FIGS. 9 and 10, illustrating the principle of the invention, show another embodiment of the locking device. In the same way as in FIGS. 3 to 7, the catches 11 and 12 operate beside each other. The difference is that their engagement surfaces are not displaced in relation to each other. Instead, the locking element 7 is provided with two rows of teeth 18 and 19. Each of these rows consists of evenly spaced teeth, but the rows are displaced half a tooth distance from each other. The catch 11 thus operates against the tooth row 18 and the catch 12 against the tooth row 19.

Figure 11:
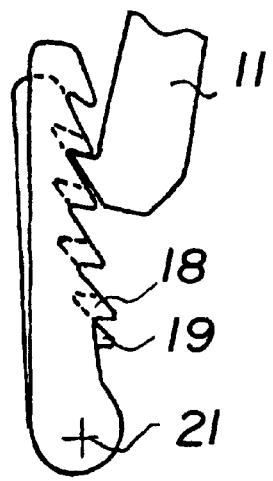
FIG. 11 is a side view showing a locking element with two rows of teeth which can be turned in relation to each other.

FIG. 11, illustrating the principle of the invention, shows yet another feasible embodiment of the locking device according to the invention. In this embodiment also, the locking element 7 is provided with two rows of teeth 18 and 19, displaced half a tooth row. These can be turned in relation to each other around the joint 21 and thus operate alternately against half the width of a fixed catch 11. This occurs under the influence of spring elements which, like the operating lever, are not shown in the Figure.

Various embodiments of the present invention have been described here. Common to all of them is that the locking member 8 comprises two catches and/or that the locking element 7 comprises two rows of teeth. When these catches and/or rows of teeth are displaced in relation to each other, the desired combination is achieved—reliable locking function and locked positions for the joint situated close together. The invention can of course be varied in many different ways. A locking member is possible, for instance, having more than two catches and/or a locking element having more than two rows of teeth, thus enabling ever larger teeth and/or locked positions of the joint even closer together. Other forms of locking surfaces than teeth are also possible. The catches of the locking member 8 may be replaced by pins, for instance, operating against hole patterns in the locking element 7. These and other embodiments obvious to one skilled in the art are deemed to lie within the scope of the invention as defined in the following claims.

FIGS 12 through 42 show further developments of the invention, relating to connection means for connecting the rear, hand-held parts of the tool with jaws, as well as means for connecting the jaws of the tool with collet jaws or similar elements for manipulating objects.

Conventional pliers have the drawback that the hand-held shafts and the forward portions affecting the object are integrated in one piece. For this reason the shape of the jaws cannot be easily varied. Common to all tong-like tools, and particularly clamping and retaining tools, is that it should preferably be possible to use them in as many contexts as possible. This preference places incompatible demands on the design of the jaws. Short but wide jaws may be required for one workpiece, for instance, C-shaped jaws for another workpiece, jaws with a large opening for a third, and so on. No satisfactory solution has hitherto been found to this problem. Tool manufacturers have provided tools with a small number of different jaws designs, depending on the high cost of production tools and storage of the finished products. In practice the user converts the tools by welding on the desired jaws. This is particularly usual with welding tongs. Similar problems exist as regards collet jaws and the like. The most usual types are soft, designed to protect the workpiece from damage caused by the jaws. Common to such known soft collet jaws is that they are fitted onto the jaw from the front, like shoes, partially enclosing the forward part of the jaws. The drawback with such a connection is that the collet jaws easily become detached and are lost. Another type of collet jaw often used is foldable, designed to present parallel clamping surfaces in all positions of the jaws. Such foldable collet jaws are provided with flanges between which the forward part of the jaw is inserted. Collet jaw and jaw are held together with a rivet or the like, inserted through a hole in the flanges and the jaw, around which rivet the collet jaw can tilt. The drawback with this connection is that it is relatively expensive to manufacture. A serious drawback is that the connection is permanent and the collet jaws cannot easily be exchanged for collet jaws more suitable to other workpieces. Long, straight collet jaws are desirable for clamping long workpieces such as beading. Conventional clamping tools cannot easily be provided with such collet jaws and an intermediate rod must be applied, which is time-consuming. Another known need is to secure two workpieces parallel or at an angle to each other. This need cannot easily be satisfied by tong-like tools on the market since they are not designed to be connected together.

DESCRIPTION OF FURTHER DEVELOPMENT OF THE INVENTION.

The main object of the further development of the invention is to provide a device and a method relating to hand tools that employ a pair of jaws to receive a workpiece between them, said device and method permitting simple and inexpensive manufacture of tools with different jaws and collet jaws.

Another object is to provide a device and method permitting jaws and/or collet jaws to be easily exchanged and combined.

Another object is to provide a device and enable simple adjustment of various work areas.

Another object is to provide a device that permits simple combination of several tools parallel or at a desired angle to each other.

Yet another object is to provide a means that enables a reliable connection, particularly for soft collet jaws.

These objects are achieved with a coupling arrangement between shaft and jaw, and between jaw and collect jaw, respectively, comprising grooves and ridges located substantially perpendicular to the longitudinal direction of the tool.

Although the further development of the invention will be described in the following with reference to a hand-operated clamping tool, it is implicit that the invention also relates to all other types of tong-like tools, with or without crossing shafts, as well as screw clamps and the like where one jaw can be moved along a rod.

FIGS. 12 through 17 and 19 through 23 show further development of the invention relating to application of exchangeable collet jaws. This is illustrated on an embodiment of the tool comprising two shafts 1 and 2, jaws 3 and 4, spring element 5 and locking element 7, 10, 11, 12, 15, as previously. The shafts in this embodiment are injection-moulded from reinforced plastic and made in the shape of U-sections turned so that their open sides are facing each other. The Figures show sectional views, with the waist of the U-sections and reinforcing ribs in section and the rear flanges of the U-sections visible. Through-running, grooves 26 are arranged in the forward end parts of the jaws, arranged substantially perpendicular to the longitudinal direction of the tool. The openings of the channels are preferably smaller than their greatest width, and facing each other. Collet jaws 43, provided with ridges 25 the same shape as the grooves 26 can thus be inserted into the grooves 26 and remain there, as shown in FIGS. 12 and 13. When squeezing force is applied the collet jaws are pressed against the grooves. The fact that the grooves and ridges face each other and are oriented transverse to the longitudinal direction of the tool ensures that the collet jaws will remain securely in place at all normal handling, although they can easily be exchanged. They are normally affected so little laterally that they can be locked with a friction element such as a spring and can therefore be exchanged without the need for tools. The groove shape may of course be reversed so that the collet jaws 43 are provided with grooves surrounding ridges on the end parts of the jaws. Since the grooves 26 are through-running, the collet jaws 43 may have the same cross section and can therefore be manufactured cost effectively by extruding plastic or aluminium. This method of manufacture ensures straight ridges 25 and clamping surfaces, which is necessary for good function. Collet jaws of different lengths can also be easily manufactured, e.g. protruding from both sides of the tool, thus enabling long workpieces to be clamped in a simple and reliable manner. The design of the ridges and grooves 25 and 26 also enables connection of several tools on the same collet jaw 43, thus enabling the desired pressure to be achieved even with long collet jaws. The cross-sectional shape of the ridges and grooves 25 and 26 may be circular or non-circular.

Figure 20:
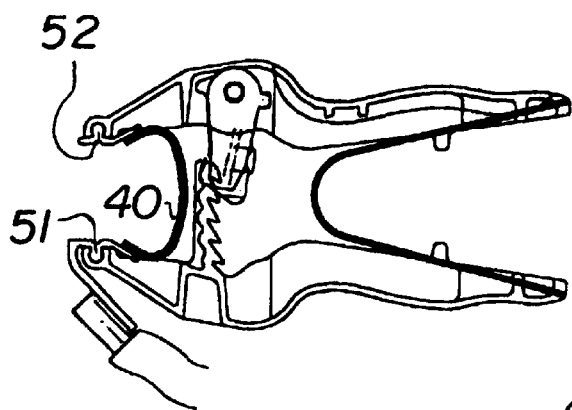
Figure 21:
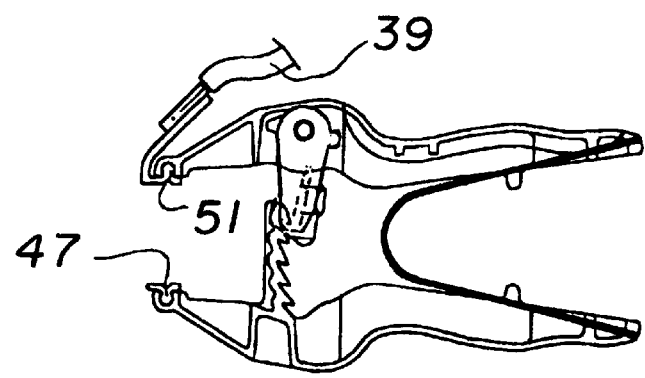
Figure 22:
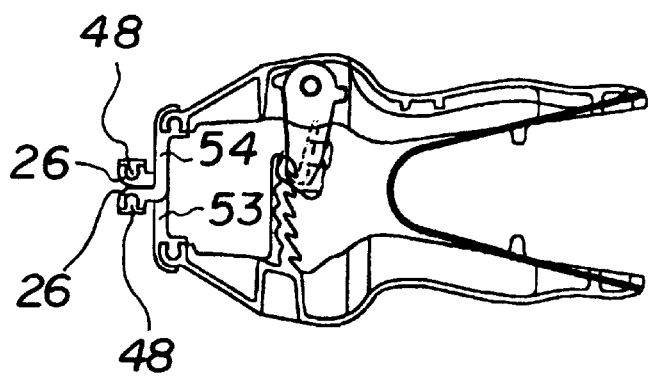
FIG. 22 shows the tool provided with crossing collect jaws for pressing apart two surfaces.

A circular cross section allows tiltable collet jaws to be easily fitted so that parallel clamping surfaces are obtained in all jaw positions. The cross section may also be toothed so that the desired angle between jaw and collet jaw can be achieved. FIG. 14 shows a collet jaw 44 fitted in the tool, with a right-angled bracket to securely clamp round objects 35. If the collet jaw 44 is long, several tools can be combined on the same collet jaw 44. If the collet jaw 44 is produced by extruding aluminium, for instance, and is therefore of high quality with regard to cross-sectional shape and straightness, such a combination enables several workpieces to be easily 10 secured parallel to each other. FIG. 15 shows the tool with collet jaws 45 and 46 inserted in the grooves 26, said jaws retaining workpieces 33 and 34 at right angles. FIG. 16 shows the tool with collet jaws 47 provided with transverse fluting to hold workpieces securely without their turning. FIG. 17 shows the tool with collet jaws 49 intended to increase the clamping height so that tall workpieces 36 and 37 can be gripped. The clamping surfaces of the collet jaws 49 are provided with grooves 26 into which collet jaws 48 are inserted. These collet jaws are extruded from a thermoplastic material and provide a yielding clamping surface so that soft workpieces can be retained without risk of damage. Since the collet jaws are provided with ridges and grooves 25 and 26, respectively, they can be connected together to add additional clamping height, as illustrated in FIG. 18. FIG. 19 shows the tool with a collet jaw 50 provided with an upwardly directed part having a hole for a hook 38. A workpiece 36 can thus be suspended in a transport system, for instance. FIGS. 20 and 21 show the tool provided with contact jaws 51 and 52. A conductor 39 for electric current is connected to jaw 51. Jaws 51 and 52 are suitably made of copper and joined to the current conductor 40. At low current strengths the device can be simplified to have only a current-conducting contact jaw 51 according to FIG. 21. If a force is required to separate two surfaces, the tool may be provided with crossing collet jaws 53 and 54 according to FIG. 22. One collet jaw can then be shaped with two fork legs between which the other collet jaw can move freely. The clamping surfaces are provided with grooves into which soft collet jaws 48 are inserted. When fitting false ceilings, for instance, a clamping function is required at a different level from the clamping tool.

Figure 23:
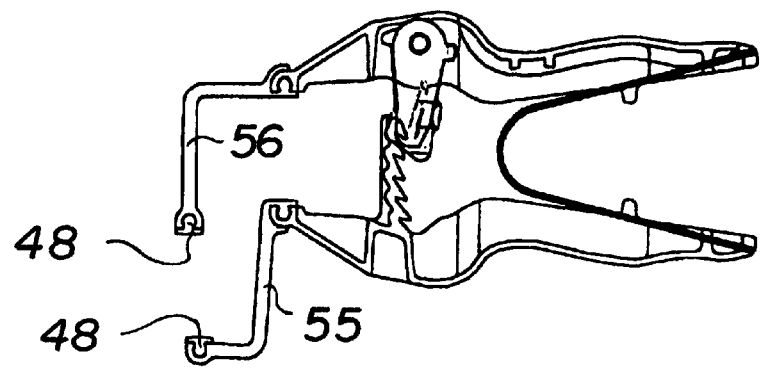
FIG. 23 shows the tool provided with collet jaws pointing downwards.

This requirement can be satisfied using collet jaws 55 and 56 according to FIG. 23, these being provided as before with soft collet jaws 48.

Many different variations, intended for varying purposes, are also feasible besides the collet jaws described in the paragraph above. The shared idea is that, thanks to the transverse ridges and grooves 25 and 26, the collet jaws remain in place, are tiltable if desired, and can easily be exchanged by the operator without the use of tools and, finally, that they can be combined in many ways.

The same inventive concept can be advantageously applied to tool jaws, as will now be described in more detail. It is desirable, with one and the same jaw, to be able to manufacture a clamping tool for different working ranges. This is possible with an arrangement according to FIGS. 24 to 26. FIG. 24 shows the forward part of the lower shaft 2 of the tool, provided with transverse grooves 26, spaced equally apart. A loose jaw 57 is provided with rearwardly facing ridges 25 to fit the grooves 26 so that the jaw 57 can be inserted in different positions, as shown in FIGS. 25 and 26. The jaw may be permanently secured in some position, e.g. the ridges 25 being upset at both ends, or may be movable to a desired position by the operator. FIGS. 27 and 28 show a coupling arrangement between the shaft 2 and a jaw 58, which is reliable but at the same time can be dismantled. The forward part of the shaft 2 is provided with a recessed groove 30 and a pivotable yoke 29. The rear part of the jaw 58 is provided with two ridges 27 and 28. During assembly the ridge 27 is hooked into the groove 30, after which the yoke 29 is swung over the ridge 28, as shown. in FIG. 28. In locked position the yoke 29 and corresponding forward end of the shaft 2 form a groove for the ridge 28.

The advantage of this dismantlable coupling is that, besides withstanding clamping forces, it is also firmly ensconced to withstand lateral forces.

Figure 29:
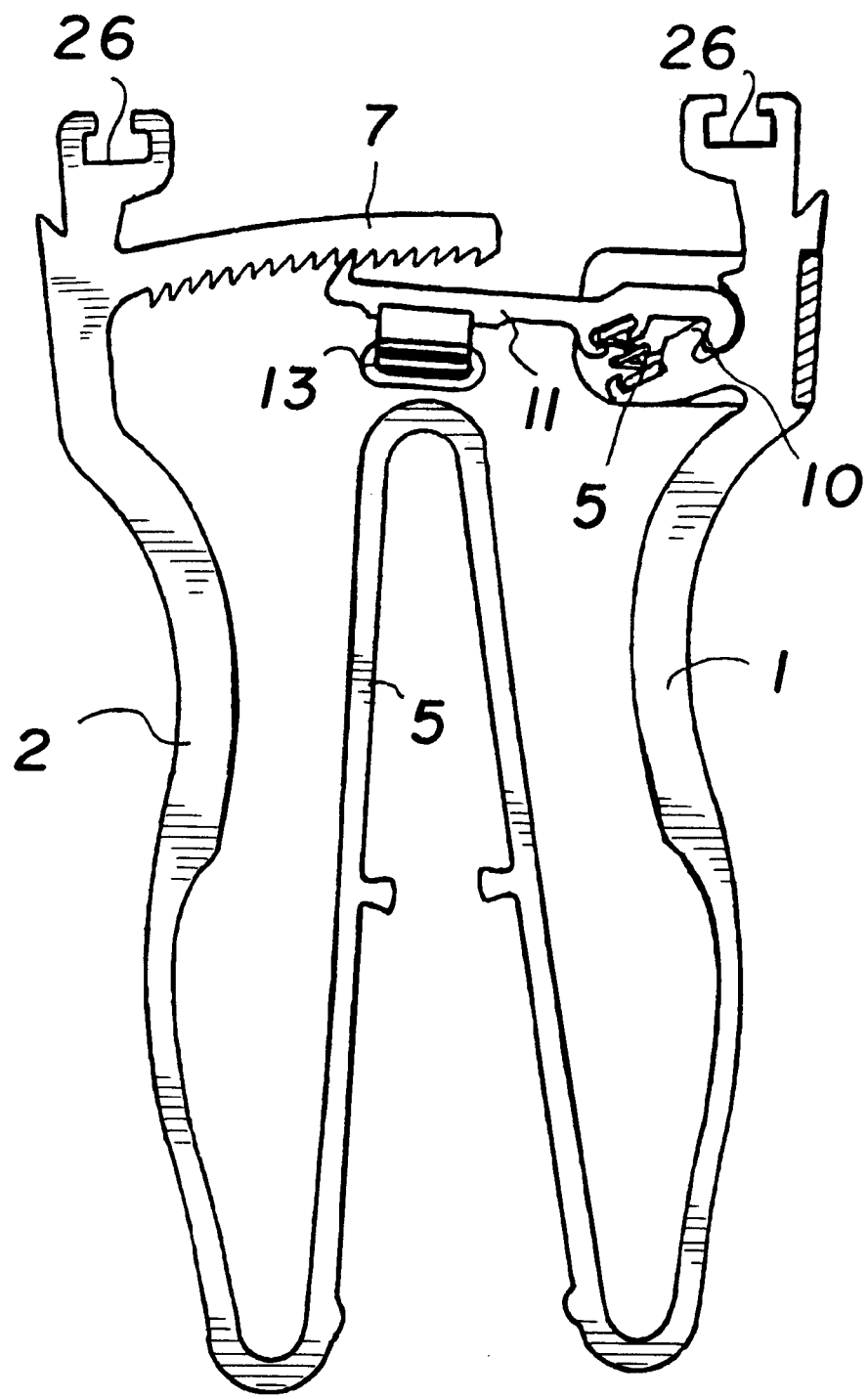
FIG. 29 is a side view of a tool with coupling arrangements for jaws.
Figure 30:
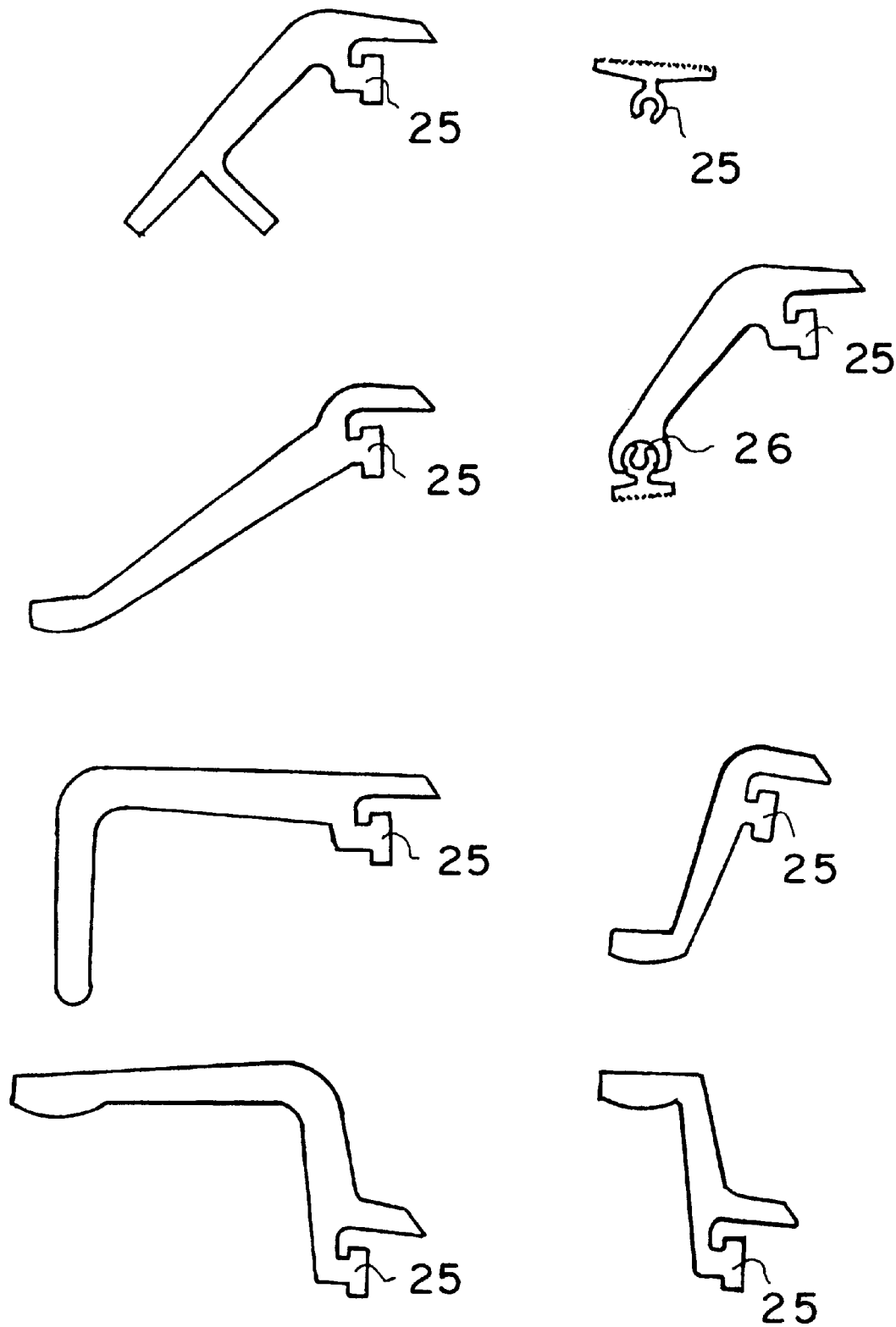
FIG. 30 shows side views of various types of jaws to fit the tool according to FIG. 29.
Figure 31:
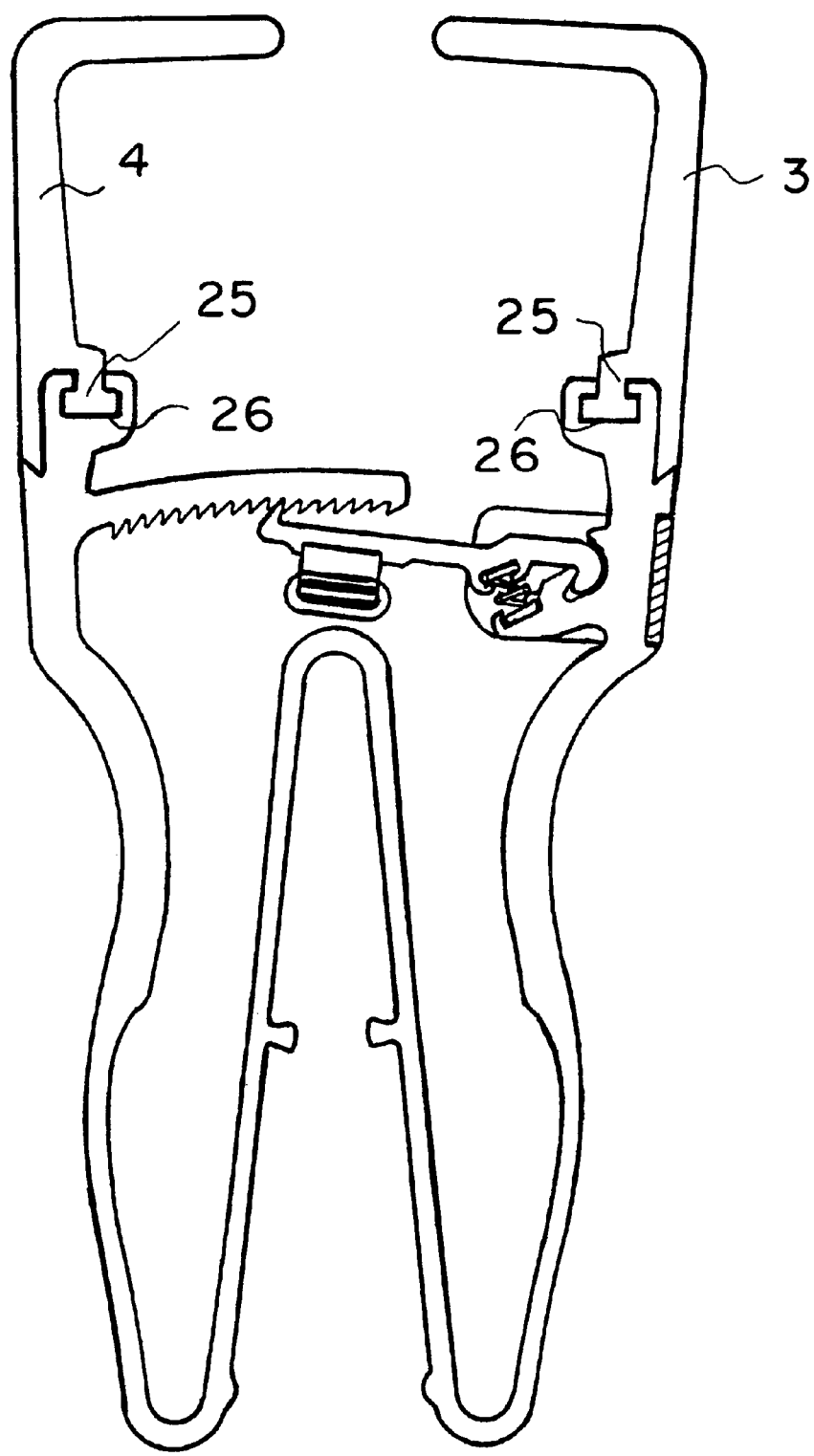
FIG. 31–32 are side views of tools according to FIG. 29 with applied jaws in various forms according to FIG. 30.
Figure 32:
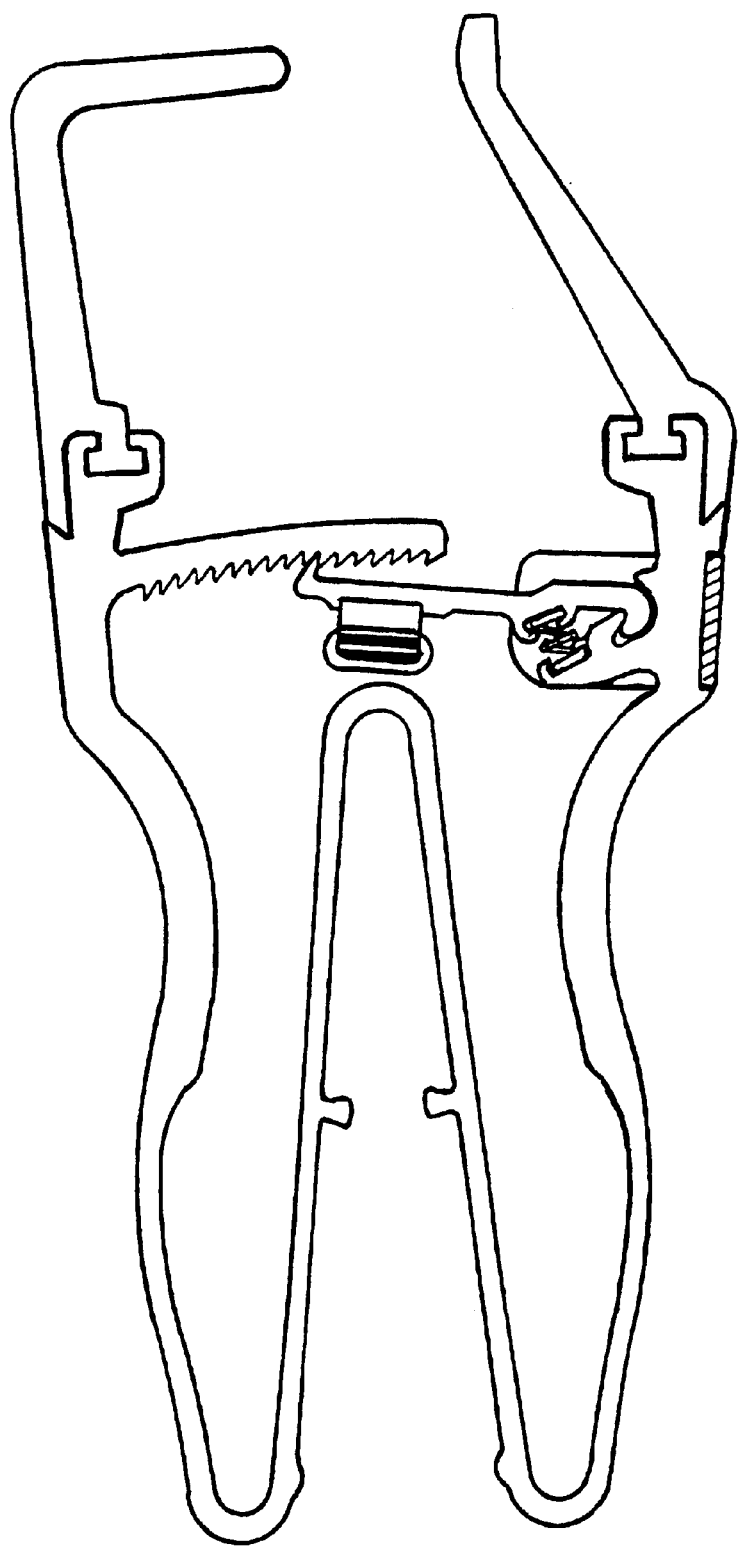

FIG. 29 shows a clamping tool with shafts 1 and 2 and an intermediate spring 5, manufactured in one piece from an extruded aluminium profile. As previously, the tool comprises a locking device 5, 7, 10, 11 and 13. The forward parts of the shafts are provided with arrangements for jaws comprising T-shaped channels 26. T-shaped ridges 25 on desired jaws according to FIG. 30 can be inserted into these channels 26. FIG. 30 also shows collet jaws with external circular grooves 25 that can cooperate with corresponding forward circular grooves 26 on a jaw. FIGS. 31 and 32 show the tool according to FIG. 29 combined with different combinations of jaws 3 and 4 from FIG. 30. The jaws are thus inserted in laterally running grooves and can then be permanently secured by means of upsetting, without the need for any other connection elements. It is extremely advantageous in this case to use shortened aluminium sections for the jaws as well, since the connection surfaces 25 and 26 can then be manufactured with high quality as regards shape and parallellity, at low cost. The connection is thus free from play and ensures that the shaft and jaw are parallel. In this way a large number of different clamping tools can be produced, starting from the same basic tool. Since these different jaws can be manufactured with high quality from shortened, extruded aluminium sections, the cost of production tools will be low and a large number of different jaws can be produced at reasonable cost. The coupling arrangement also allows jaws to be easily combined, so that even a small number of jaw variants enables a large number of different tools to be manufactured. Finally, the cost of stocking will be low since one and the same basic tool can be completed to form the desired tool. Even a small number of clamping tools with a particular jaw configuration can therefore be manufactured and supplied without unreasonable expense.

Figure 33:
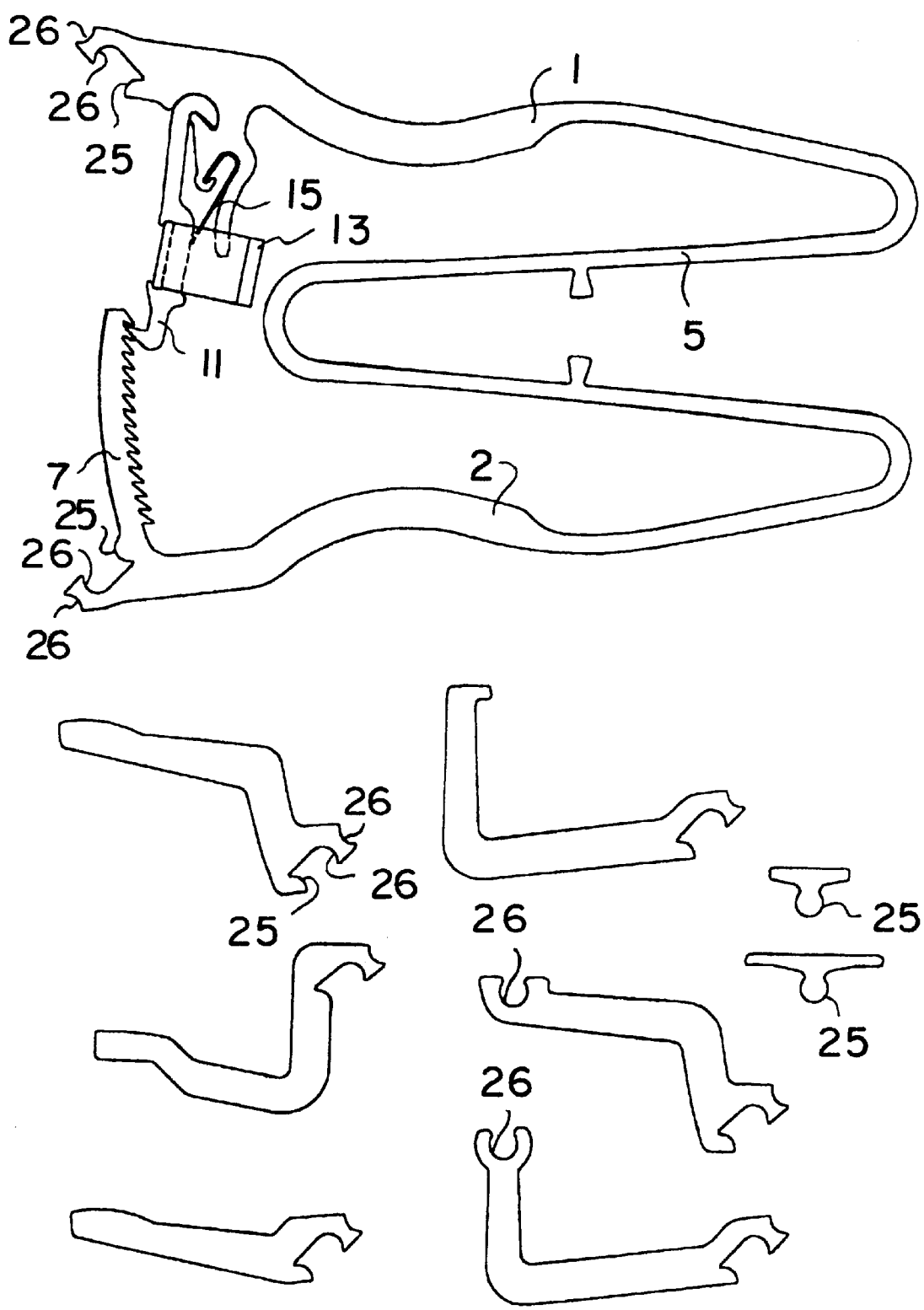
FIG. 33 shows side views of a tool and separate variations of jaws with alternative coupling arrangements.
Figure 34:
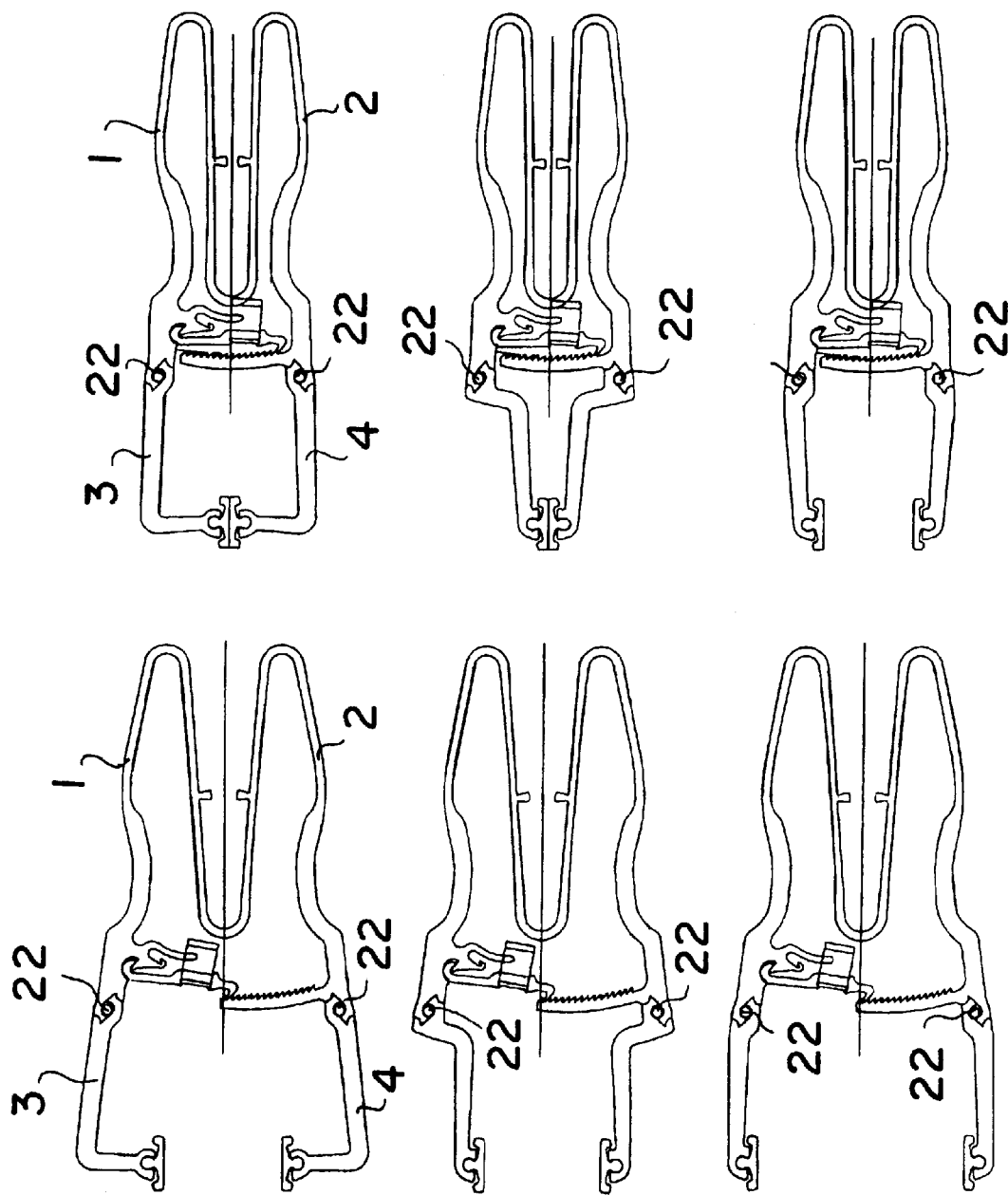
FIG. 34 shows side views of a tool according to FIG. 33 with various jaws fitted.

FIG. 33 shows an alternative embodiment of the basic tool with shafts 1, 2 and spring 5 manufactured in one piece from an aluminium section, and various jaws, turned for connection with the lower shaft 2. The Figure also shows two different collet jaws with ridges 25 designed for insertion into corresponding grooves in the forward part of two of the jaw variants shown. The coupling arrangement on the forward part of the shafts comprises two grooves 26, an outer and an inner, and a ridge 25. The ridge 25 cooperates with the outer groove 26 on a jaw. The outer groove 26 on the shaft 2 also cooperates with the corresponding ridge 25 on a jaw. The inner groove 26 on the shaft and the inner groove 26 on the jaw combine to form a circular hole into which a circular pin 22 is inserted at assembly according to FIG. 34, whereupon shaft and jaw are secured held together. FIG. 34 shows the tool with three different jaw configurations fitted. The tool is shown both in open and closed position. The circular pin 22 used at assembly may be a rivet, for instance, or a springy tension pin. The advantage of this type of connection is that the tolerance requirements at manufacture of the ridge and groove surfaces 25 and 26 may be relatively low and still provide an lay-free connection that can be dismantled. The inner grooves 26 may naturally form a non-circular channel for cooperation with a pin having a corresponding cross section. The advantage with a circular channel is that inexpensive standard pins can be used.

Besides those described above, the inventive concept naturally encompasses many other possible ways of securely combining shafts with the desired jaws.

Figure 35:
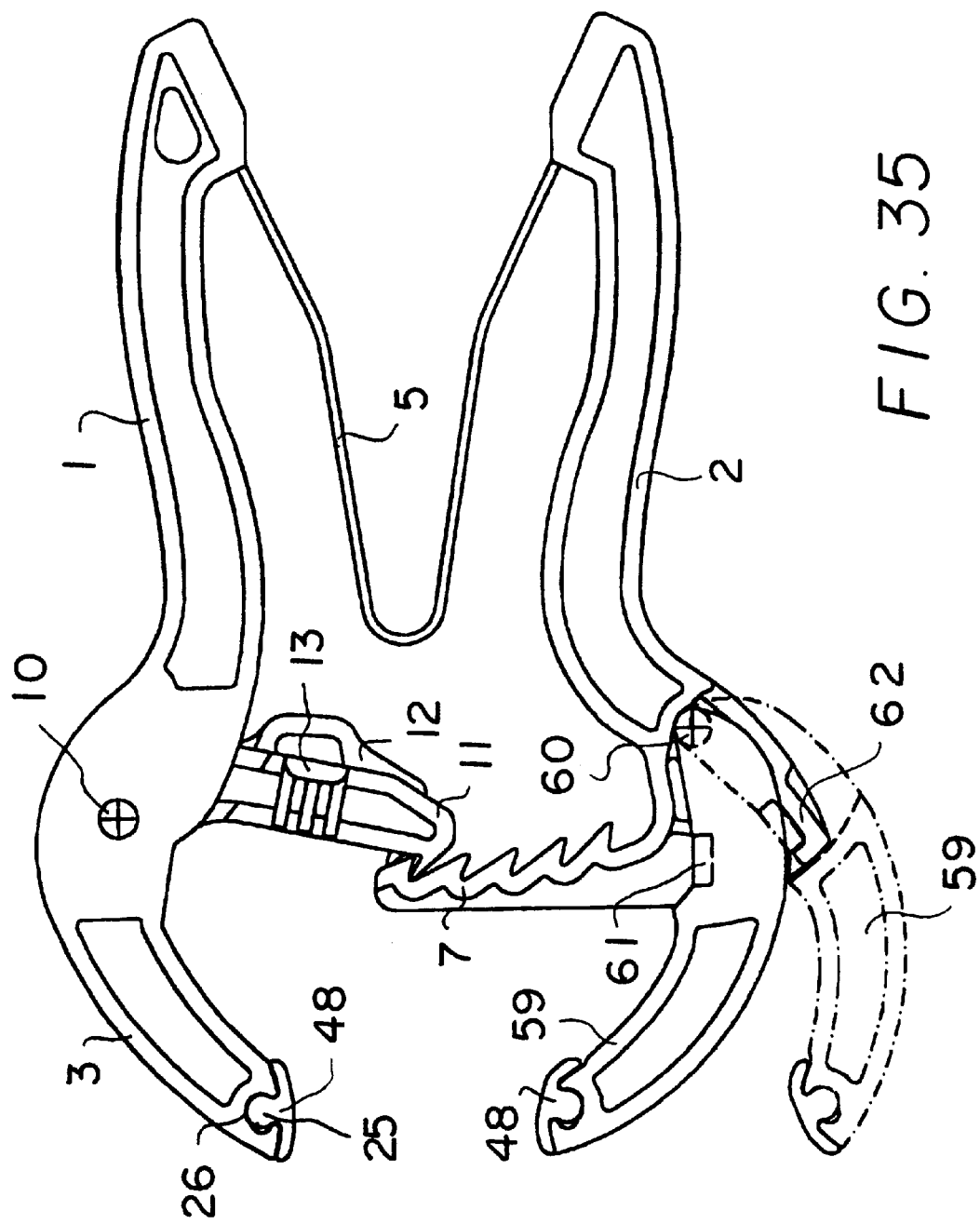
FIG. 35 is a side view of a tool in which the lower jaw is adjustable for two different working ranges.
Figure 36:
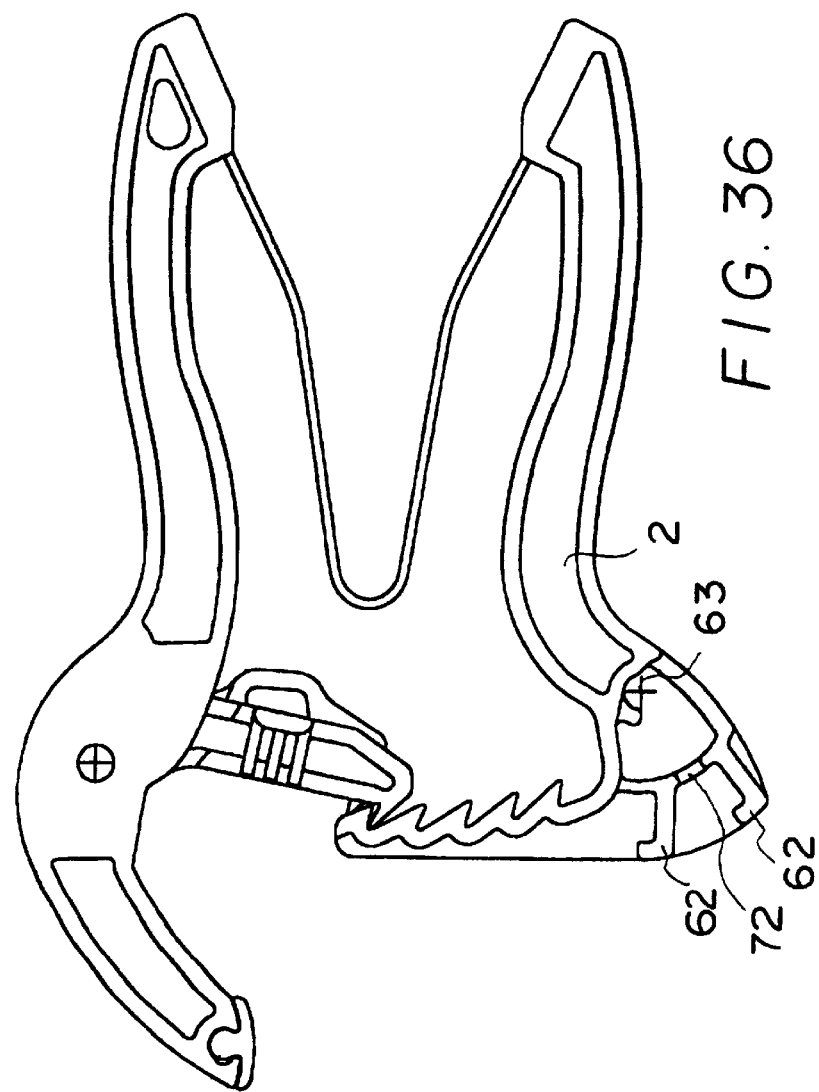
FIG. 36 is a side view of the tool according to FIG. 35 with the lower jaw removed.
Figure 37:
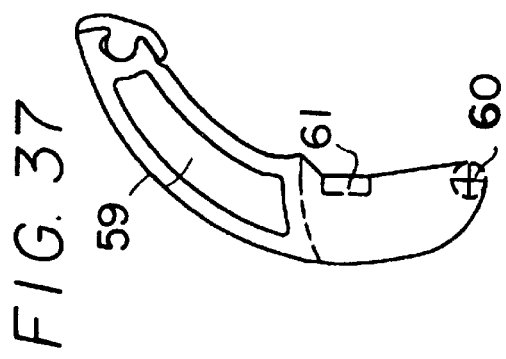
FIG. 37 is a side view of adjustavle lower jaw according to FIG. 35.
Figure 38:
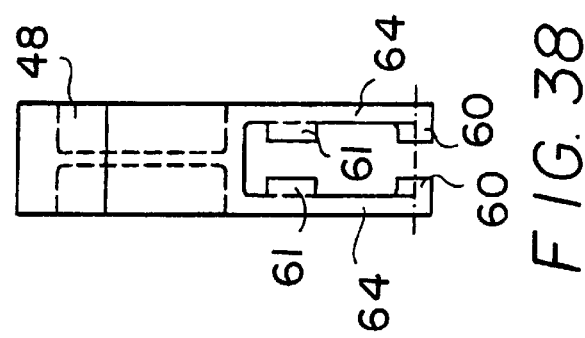
FIG. 38 is a view from above of the jaw according to FIG. 37.

FIGS. 35–38 show yet another embodiment of the invention. The tool is manufactured from injection moulded reinforced plastic, the shafts 1, 2 and upper jaw 3 constituting a coherent part with a steel spring 5 embedded at its ends. A soft collet jaw 48 is inserted in an inner groove 26 in the forward part of the jaw 3. A locking element 7, 10, 11, 12 and 13 is provided as previously. FIG. 35 shows the tool with a lower jaw 59, and collet jaw 48. The jaw can be set by the operator in two positions, the lower position being indicated in dotted lines. The working range of the tool has thus been doubled as regards height of the opening, which is extremely advantageous. FIG. 36 shows in detail the coupling arrangement on the forward part of the shaft 2. This forward part of the shaft 2 comprises a forward-pointing wing with protruding ribs on both the right-hand and the left-hand side of the tool, forming channels 62 and 63. The channel 63 forms a fulcrum around which the jaw 59 can be pivoted when setting the two positions. These positions are defined by the channels 62 which partially surround ribs 61 on the jaw 59 according to FIGS. 37 and 38. The jaw 59 is manufactured from a piece of injection-moulded reinforced plastic. At its forward end a soft collet jaw 48 is inserted into a channel. The rear part of the jaw is provided with two fork legs 64, right and left. Each leg 64 is provided on the inner side with a circular shoulder 60 and a rectangular rib 61. The shoulder 60 and rib 61 form external grooves intended on the right and left sides to cooperate with corresponding internal grooves 63 and 62. Basic assembly is performed at manufacture by pushing the shoulders 60 on the jaws 59 over the bevels 72 on the shaft 2. The fork legs 64 thus yield outwards and then return to their original shape. The shoulders 60 are thus inside the recesses defined by the grooves 63 and the jaw is hooked permanently into the tool. The operator sets the desired working range by pulling the jaw forward so that the shoulders 60 are moved as far forward as possible in the surrounding recesses. The rib 61 on the jaw 59 can then be swung past the channels 62 on the shaft 2. The jaw 59 is thereafter inserted into the desired position and the rib thus hooks into the upper or lower of the channels 62. Setting is completed by turning the jaw downwards in the clamping direction. The shoulders 60 then snap into corresponding channels 63. If the connection parts are manufactured with good precision, which can easily be achieved with injection moulding, the connection will be play-free. The channels 62 can also be shaped to partially surround the ribs 61 rearwardly, so that a snap function is obtained ensuring that the jaw cannot involuntarily become detached from the set position. The connection between jaw and shaft described above provides a reliable connection in the event of influence by clamping forces, i.e. if the jaw is turn counter-clockwise. The jaw is also secure against lateral forces and forces along the tool. The operator can easily change the working range by pressing the jaw 59 upwards towards the upper jaw 3, or by turning the jaw 59 in clockwise direction. The jaw is then turned about the centre of the grooves 63 and the ribs 61 are released from the corresponding channels 62, after which the jaw can be pulled forward and swung into the second position.

Figure 39:
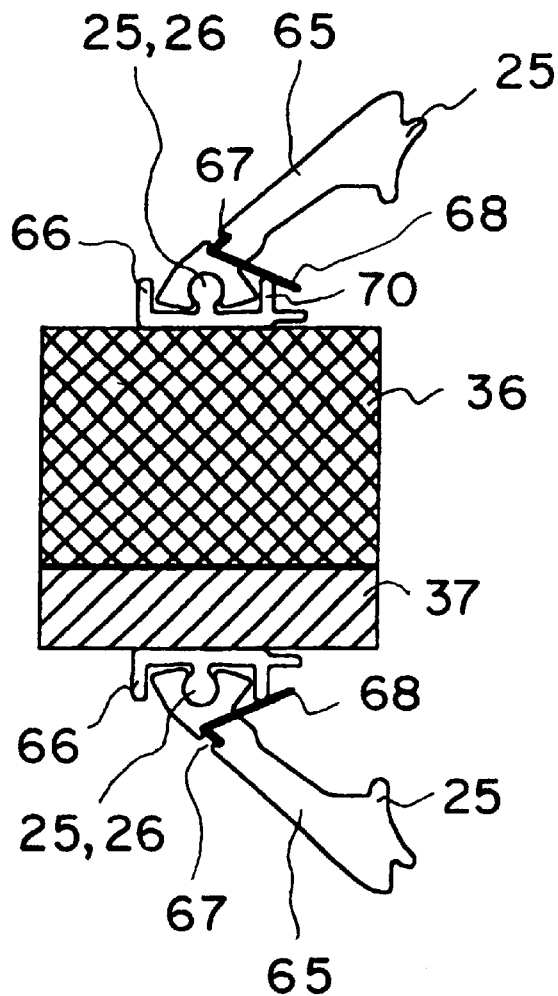
FIG. 39 is a side view of two jaws with tiltable collet jaws in contact with a workpiece, revealing elements for securing the collet jaws in the jaws.

FIGS. 39–42 show a device for detachably locking collet jaws 66 to jaws 65. A wire spring 68 is used as locking element. This spring is shaped as a U. both ends being bent inwards towards each other and then bent outwards, the ends thus forming two hooks. The hooks are bent to V-shape and form external channels which are pressed from right and left into internal channels 67 on the jaw. With correct dimensioning and soft jaw material such as aluminium, the V-shape of the hooks will cause their free ends to cut into the channels 67 of the jaw 65 and the wire spring 68 will therefore be securely connected to the jaw 65 even under the influence of lateral forces. The closed part of the wire spring 68 cooperates with a wing 70 on the collet jaw 66. As previously, collet jaw 66 is provided with a ridge 25 inserted into a groove 26 in the jaw 65. The ridges and grooves have circular cross section and the collet jaw is therefore tiltable. FIG. 39 shows two workpieces 36 and 37 being clamped. The jaws 65 are provided at the rear ends with ridges 25 to cooperate with grooves in the shaft, not shown.

Figure 40:
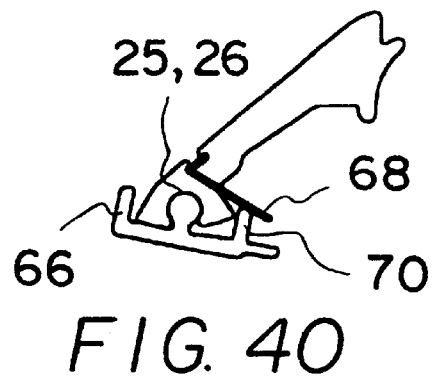
FIG. 40 is a side view of a jaw according to FIG. 39 with a long collet jaw in its position of rest.
Figure 41:
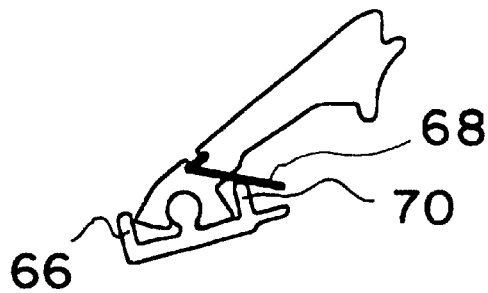
FIG. 41 is a side view of a jaw according to FIG. 39 with a long collet jaw turned to its outermost position.
Figure 42:
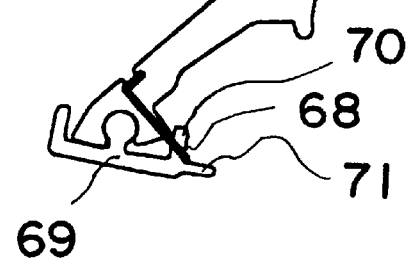
FIG. 42 is a side view of a jaw according to FIG. 39 with a short collet jaw in its position of rest.

Since the collet jaws 66 are tiltable, this ensures that they are parallel regardless of the height of the opening. FIG. 40 shows a long collet jaw 66 influenced by the wire spring 68. Since the collet jaw is longer than the width of the wire spring, its rear part rests on the wing 70 and the collet jaw 66 is thus pressed clockwise to a stop position. The friction between the wire spring 68 and collet jaw 66 and also between the jaw 65 and collet jaw 66 causes the collet jaw to be secured in the desired position in relation to the jaw. The friction force can be made sufficiently great to ensure reliable securing at normal use without preventing quick exchange of the collet jaw. If the forward parts of the collet jaw 66 and jaw 65 are also provided with wedge-shaped cooperating surfaces, the collet jaw can also be wedged in its rest position, with even more reliable securing as a result. If the collet jaw 66 is turned counter-clockwise according to FIG. 41 the wire spring 68 will be tensioned further but the collet jaw will detach from its wedged position and can easily be pushed to the side to the desired position, or exchanged. FIG. 42 shows a short collet jaw 69 in which the wing 70 is surrounded by the rear part of the wire spring 68. This rear part rests instead on a second wing 71 on the collet jaw 69 so that the collet jaw 69 is pressed clockwise to a stop position. The wire spring thus locks the collet jaw in the desired side position, thereby further securing the collet jaw. The collet jaw can easily be replaced, however, without the use of tools, by lifting the rear part of the wire spring 68 towards the inner side of the jaw so that the wing 70 is free and the collet jaw can be pushed out.

What is claimed is:

1. A pair of tongs or pliers operable with one hand comprising first and second spaced apart members each having a first end having a jaw-like part and a second end, said second ends of said first and second members being movable toward and away from each other by the use of one hand, wherein the spacing between said jaw-like parts is dependent on the spacing of said second ends of said first and second members, a first connecting element comprising a first straight toothed surface extending from a point on said first member between said first and second ends of said first member and a second connecting element comprising second straight toothed surface facing said first straight toothed surface extending from a point on said second member between said first and second ends of said second member for releasably engaging said first connecting element, compression spring means connected between said second ends of said first and second members, wherein said first connecting element is movably journalled to said first member and further including a resilient spring-like body biasing said first toothed surface against said second toothed, wherein said first toothed surface comprises first and second rows of teeth, said second row of teeth being displaced relative to said first row of teeth.

2. A pair of tongs or pliers comprising first and second members each having a first end having a jaw-like part and a second end, said second ends of said first and second members being movable toward and away from each other, wherein said first member does not contact said second member when said jaw-like parts are separated, a first connecting element extending from a point on said first member between said first and second ends of said first member and a second connecting member extending from a point on said second member between said first and second ends of said second member for releasably engaging said first connecting element, and compression spring means connected between said second ends of said first and second members, wherein said first connecting element is movably journalled to said first member, and wherein said second connecting element comprises an arm extending in a first direction from said second member having a first surface including first and second rows of teeth, the teeth of said first row being offset from the teeth of said second row in said first direction.

3. The pair of tongs or pliers of claim 2 wherein said first connecting element comprises first and second toothed arm portions and biasing means for independently biasing each of said first and second arm portions toward said second connecting element.

4. The pair of tongs or pliers of claim 3 wherein the teeth of said first arm portion are offset from the teeth of said second arm portion.

* * * * *